UNITED STATES PATENT OFFICE.

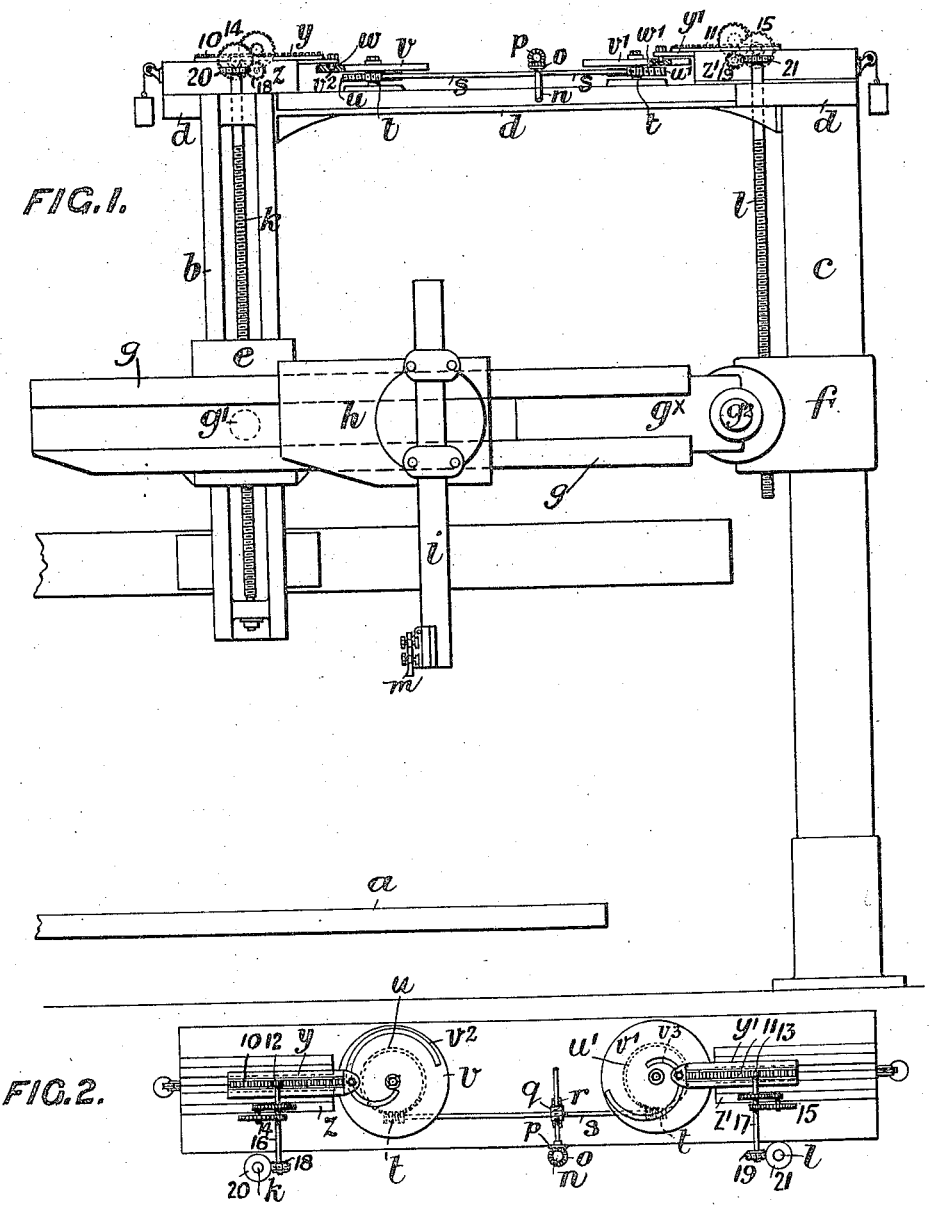

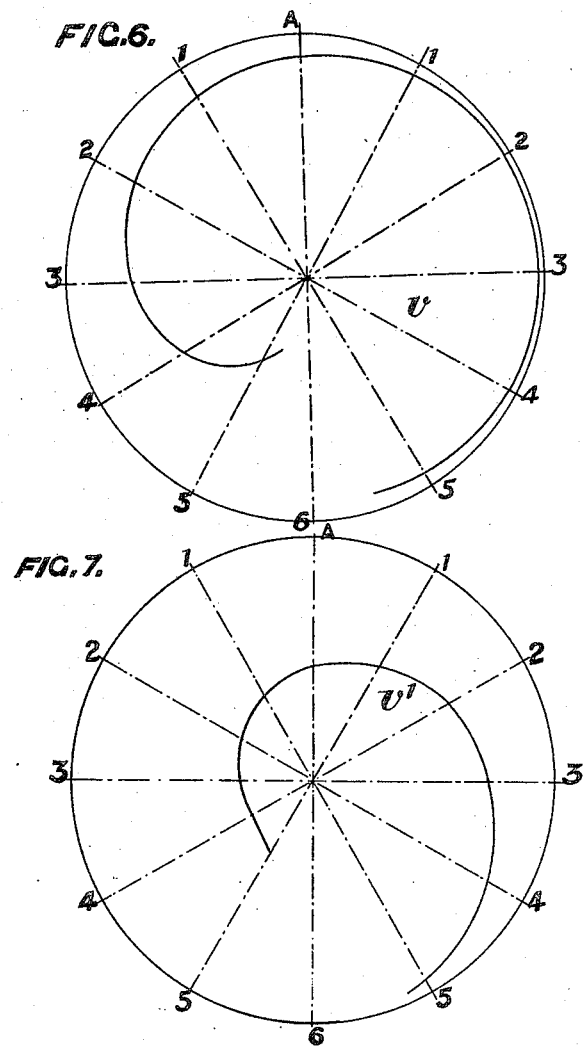

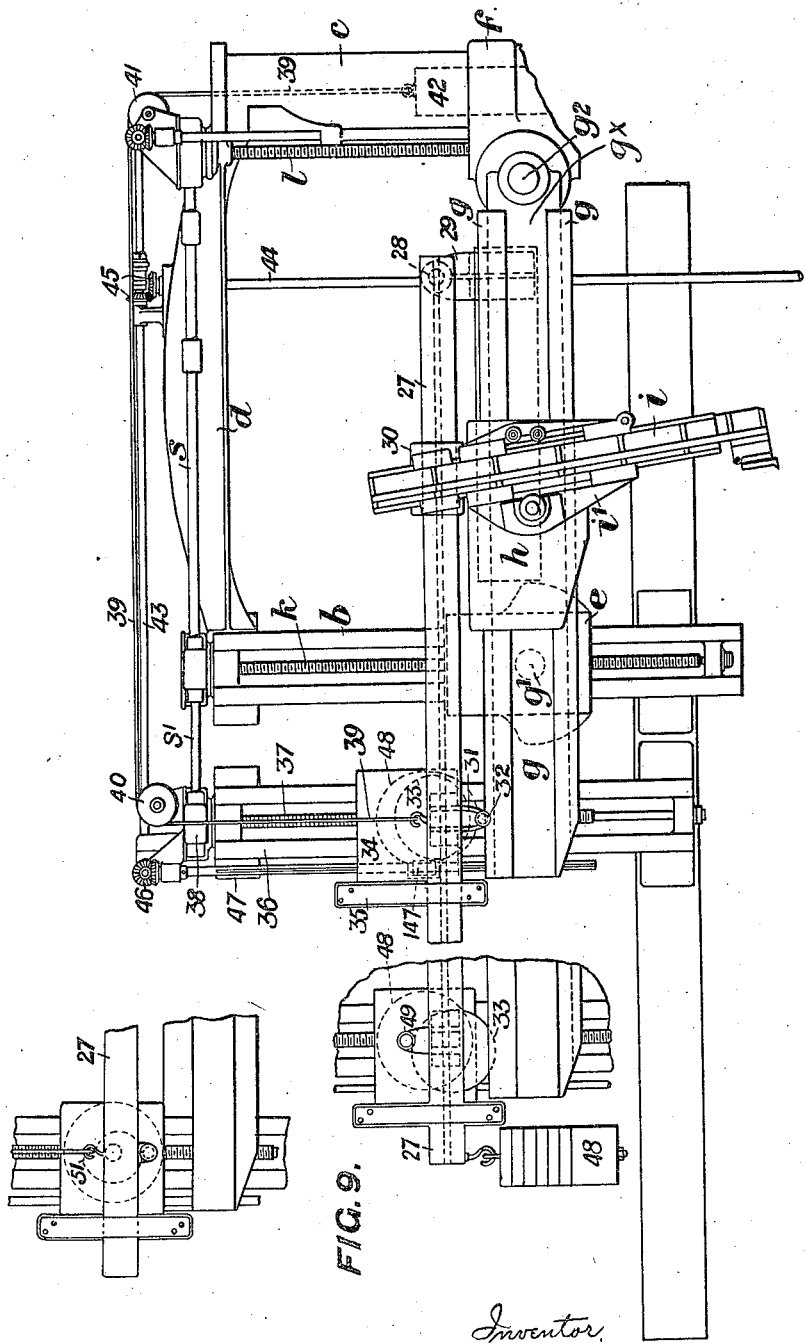

GILBERT AUSTIN CLAVEY, OF BATTERSEA PARK, ENGLAND.

MACHINE FOR PLANING OR MACHINING PROPELLER BLADES.

1,423,307.     Specification of Letters Patent.     Patented July 18, 1922.

Application filed October 19, 1920. Serial No. 418,022.

*To all whom it may concern:*

Be it known that I, GILBERT AUSTIN CLAVEY, a subject of the King of Great Britain, residing at Battersea Park, in the county of Surrey, England, have invented certain new and useful Improvements in and Relating to Machines for Planing or Machining Propeller Blades, of which the following is a specification.

This invention concerns improvements in and relating to machines for planing or machining propeller blades.

An object of the invention is to improve that type of machine described in the specification of Letters Patent No. 1,001,908 granted to William Nunn Venner August 29, 1911, and subsequently assigned to J. Stone & Company Limited.

A further object of the invention is to so improve machines of this type that the backs as well as the faces of propeller blades may be quickly and accurately machined.

In machining the propeller blade, the latter is secured to a rotatable work table while the tool, which moves radially from the tip to the root of the blade, is at the same time constrained to move vertically.

The invention has a further object to provide cam mechanism for varying the vertical feed according to the desired varying shape of the blade surface.

There may, for example, be a cam for imparting irregular motion to the saddle or slide of each column or standard or this motion may be imparted more directly to the tool bar and independently of the saddles on the columns.

And in order that the invention may be more readily understood, reference will be made to the accompanying drawings illustrating some methods of carrying out the invention and in which:—

Figure 1 is a part sectional elevation of so much of one type of machine for planing a propeller blade as is necessary for the purpose in view, and Figure 2 is a plan of the columns or standards and some of the parts thereon.

Figures 3, 4, 5, 6 and 7 are explanatory diagrams for setting out the cam.

Figure 8 is an elevation of a machine with a modified cam arrangement.

Figure 9 is a detail in sectional elevation showing another modification and

Figure 10 is a similar view of a detail of yet another modification.

Figure 3:
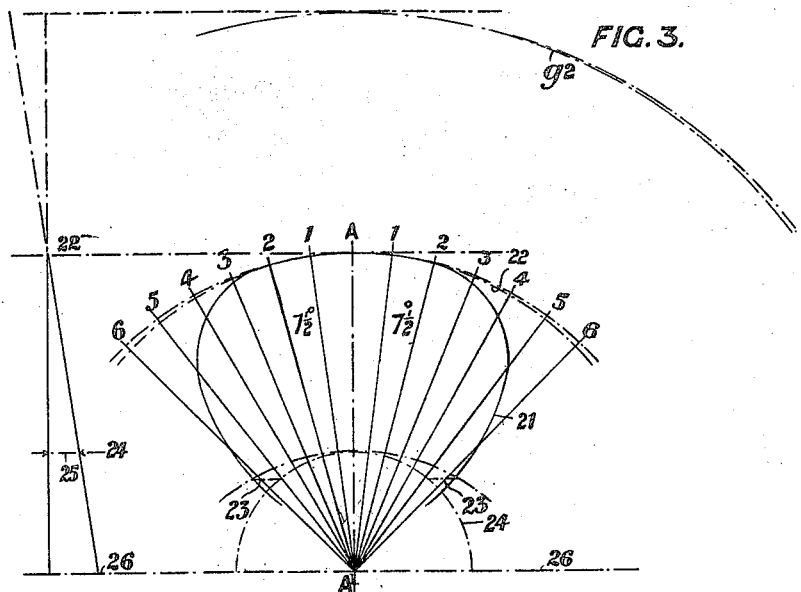

In carrying the invention into effect and according to the construction illustrated by Figures 1 and 2, the propeller or other surface which is to be operated on, is fixed in usual manner upon a circular table $a$ which is adapted to be rotated through the medium of any well known device for that purpose. Near the table are mounted two columns or standards $b$ $c$ connected by an overhead horizontal frame member or bridge piece $d$, each standard carrying a vertical slide or saddle marked $e$ and $f$ respectively, one vertical column $b$ being arranged near the middle of the work table and the other $c$ to one side of the work table. Between the vertical saddles $e$ and $f$ is pivotally mounted at $g'$ $g^2$, a crosshead, bar or slide which comprises two parts $g$, $g^x$, slidable upon one another, the part $g$ carrying a tool saddle hereafter referred to, is pivoted at $g'$ to the vertical saddle $e$ and the part $g^x$ is at one end pivoted at $g^2$ to the vertical saddle $f$, while its other end engages guides in the part $g$ so as to be capable of endwise movement with respect to the said part, and allow of extension or contraction of the distance between the pivots $g'$ $g^2$ when the crosshead or slide is moved from a horizontal to an angular position, or when the angular position is varied, during the adjustment of said crosshead. Mounted on the part $g$ of the crosshead or slide is a saddle $h$ which is adapted to carry the tool bar $i$ and is hereinafter referred to as the tool saddle. This tool saddle $h$ is caused to reciprocate on the slide or crosshead by any suitable or known means so that cuts are taken on the surface of the propeller blade in the radial direction from tip to root and the feed caused by the combined intermittent and irregular movement of the saddles $e$ and $f$ on the columns $b$ and $c$ and the slow intermittent but uniform movement of the table $a$, is in the direction of the pitch.

The two vertical saddles $e$ and $f$ are adapted to be moved or fed vertically by means of screws $k$ $l$ engaging nuts connected with the said slides. The rate of movement or vertical feed to be given to each vertical saddle, during the movement of the tool, so that the tool $m$ may cut the back of the propeller blade in accordance with the part helical formation of its surface, is determined by a further gear mechanism conveniently arranged on the two standards $b$ and $c$ and on the top member, bridge-piece or stretcher $d$ connecting the said standards, and now to be described.

A bevel wheel mechanism (comprising a shaft $n$, driven from any convenient source of power, and bevels $o$ and $p$ suitably mounted in bearings) conveys the feed from the main driving mechanism to a worm $q$ and worm wheel $r$, the worm wheel being fixed centrally on a shaft $s$ arranged parallel with the top frame member, bridge-piece or stretcher $d$. At each extremity of the worm wheel shaft $s$ is fixed a worm $t$ which engages a worm wheel $u$ or $u'$ fixed to and below a cam disc $v$ or $v'$ having a cam groove $v^2$ or $v^3$ formed therein.

In each cam groove $v^2$ or $v^3$ is a pin $w$ or $w'$ fixed to a slide $y$ or $y'$ slidable in a guide way $z$ or $z'$, so that movement of the cam will cause the slide $y$ or $y'$ to move backwards or forwards in its slide way $z$ or $z'$, each slide having formed thereon a rack 10 or 11 adapted to operate by pinions 12 or 13 a train of gear wheels 14 or 15, shafts 16, or 17, worms 18 or 19 and worm wheels 20 or 21 connected with one of the screws $k$ or $l$ operating the vertical slides or saddles $e$ and $f$ respectively.

Thus the cam $v$ will operate the vertical saddle $e$ near the root of the propeller blade which is fixed to the work table $a$, and the other cam $v'$ will operate the vertical saddle $f$ near the tip end of the propeller blade. If now the shape of these cam grooves be so proportioned as to give the correct amount of downward or upward feed to the vertical slides and through them to the crosshead or slide $g$ $g^x$ and tool bar $i$ at all points of the reciprocatory movement of the tool, and the blade surface will be machined accordingly.

The shape of the two cams is arrived at as follows: The face of a propeller blade is a part of a helix, and for the purpose of designing the cams, and as shown in Figure 3, the radius of the helix is taken as being from the centre $A'$ of the work table to the pivot or hinge $g^2$ of the cross slide, the screw $k$ actuating the vertical slide near the root end of the blade being arranged near the centre of the table, and so that the tool $m$ may move in a radial direction from the tip of the propeller blade towards the centre or axis of the propeller.

The outline of the blade is set out expanded or as a flat surface (indicated by the line 21, Figure 3), and is then divided out into a number of radial divisions, from centre $A'$ of boss to tip 22, of say $7\frac{1}{2}°$ each. It will be assumed that the blade area comes within ten of these divisions or $\frac{10}{48}$ of one complete helix, five on each side of the centre line $A'$—A, but, seeing that the blade is expanded, it appears to start outside of the lines 6 on each side of the centre line. The lines 23 point to the lines 5 where the edges of the blade are really situated. The chain line 24 indicates the root section. On the left hand side of this figure, the line 25 represents the thickness of the blade at the root. The line 26 represents the centre line or axis of the propeller and the point $A'$ represents the imaginary centre line of the screw $k$ for raising and lowering the saddle $b$.

Figure 4:
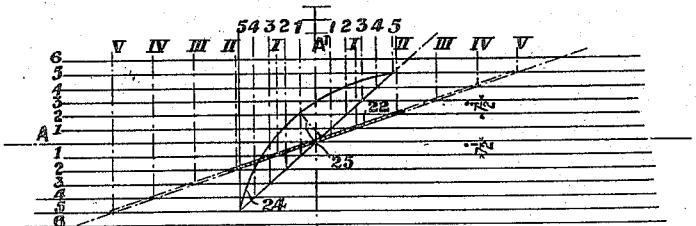

The cross sections at root and tip are now set out on their respective pitch angles to the same scale as in Figure 4 (below the diagram Figure 3) the tip section being extended to the width of the ten sections of $7\frac{1}{2}°$, or five sections on either side of the centre line $A$. From these two diagrams can now be obtained the relative vertical distance from any given point on the centre line to the back of the blade on any of the several radial lines marking the divisions of $7\frac{1}{2}°$.

Figure 5:
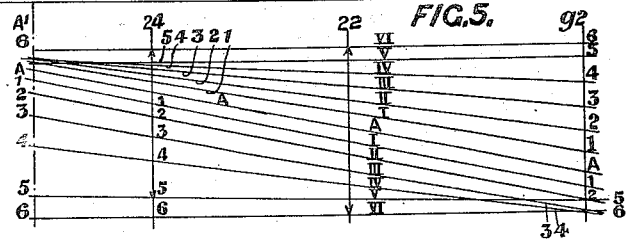

A further diagram Figure 5 is now drawn to the same scale setting out the vertical distances, for example, from line 6, that is the line marking the next division $7\frac{1}{2}°$ on either side of the centre line, to points on the lines 24 and 22 representing the root and tip sections, as determined from the diagram Figure 4, and these are set out relatively to each other and to the centre line of the propeller boss and the centre line of the cross head pivotal connection $g^2$, lines being drawn to connect the similar points on root section 24 and tip section 22 and produced on either side to the lines marking the boss centre line $A'$ and cross head pivot centre line $g^2$.

The vertical distances shown on the lines marking the boss centre line $A'$ and the cross head pivot centre line $g^2$ will give the amount of feed to be imparted to the vertical saddles $e$ and $f$ at the ends of the cross head $g$ $g^x$.

These distances are set off on the cams Figures 6 and 7 to give the form of the cam groove.

In setting out the cams, their surfaces will be divided into the same number of divisions as that employed for setting out the diagrams, which is, in this case, six on either side of the centre line, or twelve altogether, the angle between the divisions being thus 30° or four times $7\frac{1}{2}°$. In view of this it will be understood that it will be necessary for the rate of revolution of the cam plate to be four times that of the table carrying the work. Figure 6 is a diagram showing the cam $v$ for operating the leading screw $k$ of the saddle $e$ for the root or boss end of the propeller blade while the diagram Figure 7 shows the cam $v'$ for communicating motion to the leading screw $l$ of the saddle $f$ at the tip end of the blade.

Or as shown in Figure 8, instead of causing the saddles $e$ and $f$ each to be operated by a cam, there may be one cam which operates a bar pivoted to the cross head or bar slide $g$ $g^x$ the tool bar being connected to the slide bar, and so mounted as to be capable of sliding more or less vertically in the tool saddle, while reciprocating with the saddle due to the inclination the slide bar is caused by the cam, to assume in relation to the crosshead. The result is, as in the previous instance, the propeller blade is planed or machined in manner to approximately produce a helix, but the propeller blade is left much thicker at the root than at the tip when the operation has been performed. As in the first construction described, the machine comprises a circular table (not shown) adapted to be rotated at a uniform intermittent speed by any well-known means, a column or standard $b$, mounted above the middle of the table having a saddle $e$ and leading screw $k$, a column or standard $c$, mounted outside of the periphery of the table, having a saddle $f$ and a leading screw $l$ and a cross head or slide $g$ pivotally and adjustably fixed at both ends at $g'$ and $g^2$ to the said saddles $e$ and $f$. The tool bar $i$ is in this case not fixed to the reciprocating tool saddle $h$ but is adapted to slide freely in a more or less upright direction in a guide $i'$ adjustably fixed to the said saddle. Mounted on the cross head $g$ is a slide bar 27 pivoted at 28 to a slidable block 29, adapted to be adjusted along the crosshead and firmly bolted in position. If desired, the top or facing of the crosshead is provided with a rule or scale for determining the correct distance of mounting the centre pin 28 from the cam which is adapted to actuate or move the other or free end of the slide bar 27. The slide bar carries a small saddle or block 30 adapted to slide freely along the slide bar 27 and the tool bar $i$ is pivotally connected to the said small saddle 30. The free end of the slide bar has adjustably mounted thereon a bracket 31 carrying a stud and a bowl or roller 32 (indicated in dotted lines) which is adapted to roll in contact with a cam 33. This cam is revolubly mounted on a saddle 34 having a guide 35 to limit the movements of the slide bar. The saddle 34 is slidably mounted on a vertical column or standard 36 conveniently fixed to a wall or masonry. The saddle 34 is provided with a nut in which engages the leading screw 37 and this is driven by providing it with a worm wheel mounted in the casing 38 and driven by an extension $s'$ of the shaft $s$, which similarly communicates motion to the saddles $e$ and $f$. The bowl 32 for the cam 33 is kept up against the latter by a chain or rope 39 attached at one end to the slide bar 27, passing over pulleys 40 and 41 and having at its other end a weight 42. The cam 33 is conveniently driven by an overhead shaft 43, which by another shaft 44 (receiving motion from the same source of power as the table) bevel gear 45 and 46 drives the shaft 47 having a worm 147 indicated in dotted lines and slidable but revoluble with the shaft 47. The worm 147 engages with a worm wheel 48 also indicated in dotted lines and mounted on a stud in the saddle 34. The worm wheel 48 has bolted or fixed thereto the cam 33 and, when the latter revolves, it causes the slide bar to rock in a vertical plane and in rocking it also moves the tool bar $i$ up and down with it, the tool bar also traveling back and forth with the tool saddle which is reciprocated in any well known manner. The cam 33 being rotated at the same time as the table, the reciprocation of the tool and the vertical movement of the latter, all occur simultaneously and the backs of propeller blades may be planed or machined in a period which is materially shorter than when this work is performed by hand, added to which the operation is performed with mathematical accuracy and the surface is uniform.

Referring to Figure 9, the construction differs from that just described inasmuch as the weight 48 is hung on the end of the slide bar 27 and the cam bowl 49 rests on the cam 33.

In Figure 10 the construction of the cam 33 and slide bar is generally the same as described with reference to Figure 8, but the cam is provided with a projection 51 which when near the end of the stroke of the tool bar lifts the latter and with it the tool clear of the work so that it is not necessary to cut a groove or landing into which the tool may come at the end of its cutting stroke and which necessarily then requires further treatment to finish off the blade at its root, and moreover, the tool may also finish the fillet or radius at the root of the blade where it merges into the boss. Although both of the constructions of machines illustrated are of the type in which the cut is in the radial direction from the tip towards the root of the propeller blade and the combined motion of the rotating work table and the vertical movement of the saddles on the columns or standards produce the pitch, it will be evident that the invention may also be applied to other types of machines in which, for example, the cuts are taken concentrically, the table is adapted to oscillate, and the tool to reciprocate vertically and to be fed in the radial direction.

Suitable clutches and other adjuncts such as means for adjusting by hand and so on are employed wherever advisable, but their arrangement forms no part of the invention and provision thereof will be apparent to those skilled in the art to which this invention appertains.

I claim:—

1. An apparatus for machining propeller blades and like helical surfaces, comprising a power driven revoluble table, a tool radially reciprocable across said table, a tool feed mechanism adapted for feeding said tool perpendicularly to the table and in the direction of the pitch, and cam control mechanism operative upon said tool feed for changing said feed in accordance with the varying shape of the helical surface.

2. Apparatus for machining propeller blades and like helical surfaces, comprising a revoluble work table, tool holding means reciprocable radially of said table, tool feed control means extending radially of said table but inclined to the plane thereof, and operative to feed said tool perpendicularly to said table, and power driven cam mechanism in operative connection with said tool feed control means and operative to alter the relation with said table of said tool feed control means for the purpose of causing the tool to move vertically according to the varying shape of the helical surface.

3. An apparatus for machining propeller blades and like helical surfaces comprising a revoluble work-table, driving mechanism therefor, a cross head, means to raise or lower both ends of the said crosshead in relation to the work-table and a tool-saddle slidable on the said crosshead, a cam device for controlling the feed of the tool for causing the tool to be vertically adjusted before the commencement of each cutting stroke according to the required varying shape of the helical surface.

4. An apparatus for machining propeller blades and like helical surfaces comprising, in combination, revoluble work-table, driving mechanism therefor, a cross-head, means to raise or lower both ends of the said crosshead, a tool-saddle slidable on the said crosshead, mechanism to cause the said tool-saddle to reciprocate on the said crosshead, a tool-bar on the tool-saddle slidable in a direction approximately perpendicular to the work-table and a cam device for controlling the movement of the said tool-bar and to cause it to be vertically adjusted in relation to the said tool-saddle before the commencement of each cutting stroke.

5. An apparatus for machining propeller blades and like helical surfaces comprising in combination a revoluble work-table, driving mechanism therefor, two vertical columns, a saddle on each column, a crosshead connecting the saddles, a tool-saddle reciprocally mounted on the said crosshead, an adjustable guide mounted on the said tool-saddle, a tool bar adapted to slide in the said guide, a slide bar pivoted to the crosshead and slidably carrying thereon the said tool bar, a cam adapted to engage the said slide bar and mechanism for operating the said cam, the said mechanism being driven in positive relation to the driving mechanism for rotating the revoluble-work table.

6. An apparatus for machining propeller blades and like helical surfaces comprising, in combination, a revoluble work-table, driving mechanism therefor, two saddle adjusting vertical columns, a vertical feed-screw in each column, driving gear for the said feed-screws, a saddle on each vertical column in operative engagement with one of the said feed screws, a crosshead connected to the said saddles, a tool saddle, slidable on the said crosshead driving mechanism for causing the said tool-saddle to reciprocate on the said crosshead, an adjustable guide mounted on the said tool saddle, a tool-bar adapted to slide in the said guide, a slide bar pivoted at one end to the said crosshead, a slide mounted on the said slide bar and to which the tool bar is pivotally connected, a cam adapted to engage the said slide bar and mechanism for operating the said cam, the said mechanism being driven in positive relation to the driving mechanism for rotating the revoluble table.

7. An apparatus for machining propeller blades and like helical surfaces, comprising, in combination, a revoluble work-table, driving mechanism therefor, three saddle adjusting vertical columns, a vertical feed screw in each column, driving mechanism for the said feed screws, a saddle on each vertical column in operative engagement with one of the said feed screws, a crosshead connected to two of the saddles, a tool-saddle slidable on the said crosshead, driving mechanism for causing the said tool-saddle to reciprocate on the said crosshead, an adjustable guide mounted on the said tool-saddle, a tool bar adapted to slide in the said guide, a slide bar pivoted at one end to the said crosshead, a slide mounted on the said slide bar and to which the tool-bar is pivotally connected, a cam mounted on the saddle of the third vertical column and adapted to engage the said slide bar and driving mechanism for the said cam.

8. An apparatus for machining propeller blades and like helical surfaces comprising, in combination, a revoluble work-table, driving mechanism therefor, a crosshead, means to raise or lower both ends of the said crosshead in relation to the work-table, a tool saddle slidable on the said crosshead, mechanism to cause the said tool-saddle to reciprocate on the said crosshead, a tool bar on the tool-saddle, slidable in a direction approximately perpendicular to the work-table, a cam device for controlling the movement of the said tool bar in relation to the said tool saddle, and for lifting the tool bar when near the end of the working stroke, and mechanism for operating the said cam.

GILBERT AUSTIN CLAVEY.